(12) United States Patent
Thakker

(10) Patent No.: US 8,301,756 B2
(45) Date of Patent: Oct. 30, 2012

(54) METHOD AND SYSTEM FOR PROVIDING SUPPORT FOR SOFTWARE APPLICATIONS

(75) Inventor: Atul Dinesh Thakker, Maharashtra (IN)

(73) Assignee: Oracle Financial Services Software Limited, Mumbai (IN)

( * ) Notice: Subject to any disclaimer, the term of this patent is extended or adjusted under 35 U.S.C. 154(b) by 1252 days.

(21) Appl. No.: 12/022,173

(22) Filed: Jan. 30, 2008

(65) Prior Publication Data

US 2009/0193445 A1  Jul. 30, 2009

(51) Int. Cl.
*G06F 15/173* (2006.01)
(52) U.S. Cl. ......... 709/224; 709/201; 709/202; 709/203
(58) Field of Classification Search ................. 709/224, 709/201, 202, 203
See application file for complete search history.

(56) References Cited

U.S. PATENT DOCUMENTS

| | | | |
|---|---|---|---|
| 6,366,898 B2* | 4/2002 | Taivalsaari et al. | 1/1 |
| 2005/0188356 A1* | 8/2005 | Lwo | 717/120 |
| 2006/0106824 A1* | 5/2006 | Stuhec | 707/100 |
| 2008/0052701 A1* | 2/2008 | Abernethy et al. | 717/170 |

* cited by examiner

*Primary Examiner* — Lan-Dai T Truong
(74) *Attorney, Agent, or Firm* — Narenda Reddy Thappeta

(57) ABSTRACT

A method and system for providing support for a Java™ based software application in a communication system. The communication system includes a support server communicating with an application server. The Java™ based software application has a plurality of instances installed on the application server. The method includes receiving a first attribute-list corresponding to an instance of the Java™ based software application from the application server based on an operating environment of the instance. The method further includes comparing a second attribute-list stored on the support server with the first attribute-list. Thereafter, based on the comparison, a diagnostic report for the instance of the Java™ based software application is displayed.

23 Claims, 8 Drawing Sheets

METHOD AND SYSTEM FOR PROVIDING SUPPORT FOR SOFTWARE APPLICATIONS

RELATED APPLICATIONS

Benefit is claimed under 35 U.S.C. 119(a)-(d) to Foreign application Ser. 871/MUM/2007 entitled "A METHOD AND SYSTEM FOR PROVIDING SUPPORT FOR SOFTWARE APPLICATIONS" by Atul Dinesh Thakker, filed on 7 May, 2007, which is herein incorporated in its entirety by reference for all purposes.

FIELD OF INVENTION

The invention generally relates to software applications. More specifically, the invention relates to a method and system for providing support for Java™ based software applications.

BACKGROUND OF THE INVENTION

Business enterprises use software applications in order to function quickly and efficiently. Software applications used in a business enterprise automate critical business operations, for example, Supply Chain Management (SCM), Inventory Management, and Customer Relationship Management (CRM). Software applications are developed using one or more programming languages. Examples of a programming language may include, but are not limited to, C, C++, and Java™.

Java™ has emerged as one of the most widely accepted programming language. Java™ is a platform-independent language therefore, Java™ is extremely efficient for developing large-scale software applications, for example, software applications used in business enterprises.

In a business enterprise, a software application may be deployed in a plurality of operating environments, for example, User Acceptance Testing (UAT) environment, Support environment, production environment, and data migration environment. Each of these operating environments serves a specific purpose in the implementation of the software application. Each operating environment includes an instance of the software application installed for the specific purpose of a corresponding operating environment. As each operating environment has a unique objective, therefore, each instance of the software application in an operating environment is modified to suit the corresponding requirements. The instance may be for one of the core software application, the external interfaces linked to the software application, the customized components installed, and the data the software application stores. Therefore, for efficiently implementing a software application in a business enterprise, adequate support or maintenance of each instance of the software application is required. The support or maintenance is required during and after the implementation of the software application at the business enterprise.

In conventional systems, maintenance of software applications in a business enterprise is performed through a complex structure of on-site and offshore support mechanisms. In a support mechanism, users report bugs and other support requirements to one of an on-site support personnel and remote support personnel, whoever is most easily approachable by them. In response to this, one of the on-site support personnel and remote support personnel inspect the reported bug and/or other support requirement and thereafter provide a solution to the user. However, large number of the bugs reported and other support requirements raised are due to errors occurring because of mismanagement of the process for modifying a software application having a plurality of instances in a business enterprise. Therefore, conventional systems for providing support to a software application are inefficient and time consuming as a significant number of reported bugs and support requirements raised, can easily be solved if support personnel diagnose the situation holistically before fixing the reported bugs.

There is therefore a need for a method and system in which Java™ based enterprise software applications having a plurality of instances installed at a business enterprise can be effectively diagnosed by on-site support personnel and remote support personnel.

SUMMARY OF THE INVENTION

An object of the invention is to provide a method and system to provide support for Java™ based software applications.

Another object of the invention is to provide a method and system to provide remote support to maintain one or more instances of a Java™ based software application based on an operating environment of an instance of the software application. An operating environment corresponds to the environment in a business enterprise where an instance of the Java™ based software application may operate.

The above listed objectives are achieved by providing a method and system of providing support for a Java™ based software application in a communication system. The communication system includes a support server communicating with an application server. The Java™ based software application has a plurality of instances installed on the application server. The method includes receiving a first attribute-list corresponding to an instance of the Java™ based software application from the application server based on an operating environment of the instance. The method further includes comparing a second attribute-list stored on the support server with the first attribute-list. Thereafter, based on the comparison, a diagnostic report for the instance of the Java™ based software application is displayed.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Figure 1:
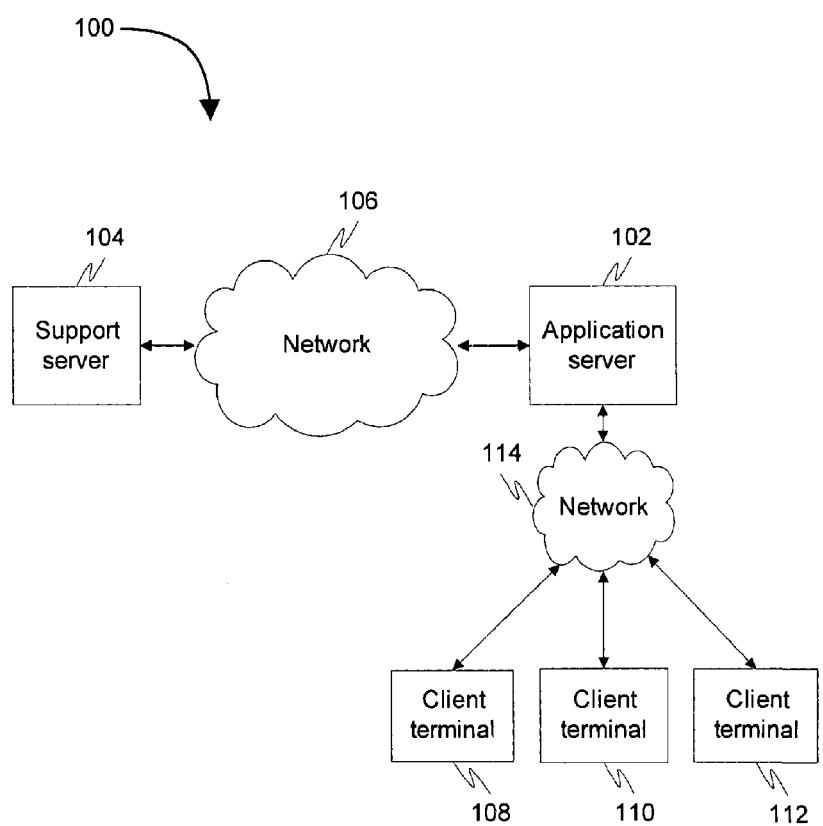
FIG. 1 is a block diagram showing an environment (that is exemplary) in which various embodiments of the invention may function.

Before describing in detail embodiments that are in accordance with the invention, it should be observed that the embodiments reside primarily in combinations of method steps and apparatus components related to a method and system for providing support for software applications. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and systems for providing support for Java™ based software applications having a plurality of instances. A Java™ based software application may be an enterprise software application. An application server, located at a business enterprise, has one or more instances of a Java™ based software application, which are accessible through a plurality of client terminals and through a support server, which is located at a remote support center. When one or more end-users raise a support request for one or more instances of the Java™ based software application, a diagnosis of one or more instances is performed. A diagnostic report for one or more instances is thereafter displayed to the remote support personnel at the support server. The support request may include one or more of, but is not limited to a bug report, patch requirement, and an enhancement requirement in one or more instances of the Java™ based software application.

FIG. 1 is a block diagram showing an environment 100 (that is exemplary) in which various embodiments of the invention may function. Environment 100 includes an application server 102 located at a business enterprise and a support server 104 located at a remote support centre. Application server 102 communicates with support server 104 through a network 106. Examples of network 106 may include, but are not limited to, a Local Area Network (LAN), a Wide Area Network (WAN), an intranet, Worldwide Interoperability for Microwave Access (WiMAX), Wireless Fidelity (WiFi), and the internet.

Application server 102 includes one or more instances (installations) of a Java™ based software application, which are independent of each other. An instance of the software application corresponds to an operating environment of a business enterprise and addresses objectives specific to the corresponding operating environment. An operating environment corresponds to the environment in a business enterprise where an instance of the Java™ based software application may operate. Examples of operating environments of a business enterprise may include, but are not limited to, User Acceptance Testing (UAT) environment, support environment, production environment, data migration environment, customization environment, and testing environment.

An instance of a Java™ based software application includes a plurality of modules of the Java™ based software application corresponding to the instance. Each module performs one or more functions of the instance of the Java™ based software application. A module may be one of a generic module, which is required by each Java™ based software application or an application-specific module, which is required by a particular Java™ based software application or by a particular n instance of the Java™ based software application. A generic module, for example, may be a core module, a logging module, or an infrastructure module. Additionally, an application-specific module in an enterprise software application, for example, a banking software application, may be a deposit module, a loan module, a General Ledger (GL) module, or a Current Account Savings Account (CASA) module.

Each module of an instance of the Java™ based software application includes one or more Java Archive (JAR) files. Each JAR file includes one or more Java classes. Each Java class is specific to the instance of the Java™ based software application.

One or more instances of a Java™ based software application in application server 102 are invoked by one or more end-users through a client terminal 108, a client terminal 110, and a client terminal 112 over a network 114 to access one or more instances of the Java™ based software application. Examples of network 114 may include, but are not limited to, a LAN, a WAN, an intranet, WiMAX, WiFi, and the internet. One or more end-users may issue support requests for one or more instances of the Java™ based software application. The support request may be one or more of, but is not limited to a bug report, patch requirement, an enhancement requirement in one or more instances of the Java™ based software application.

Based on the support request, an instance of a Java™ based software application in application server 102 may require one or more of bug fixes, patches, and enhancements. For this, on-site support personnel communicate a support request to remote support personnel for the support requirement in one or more instances of the Java™ based software application.

Figure 2:
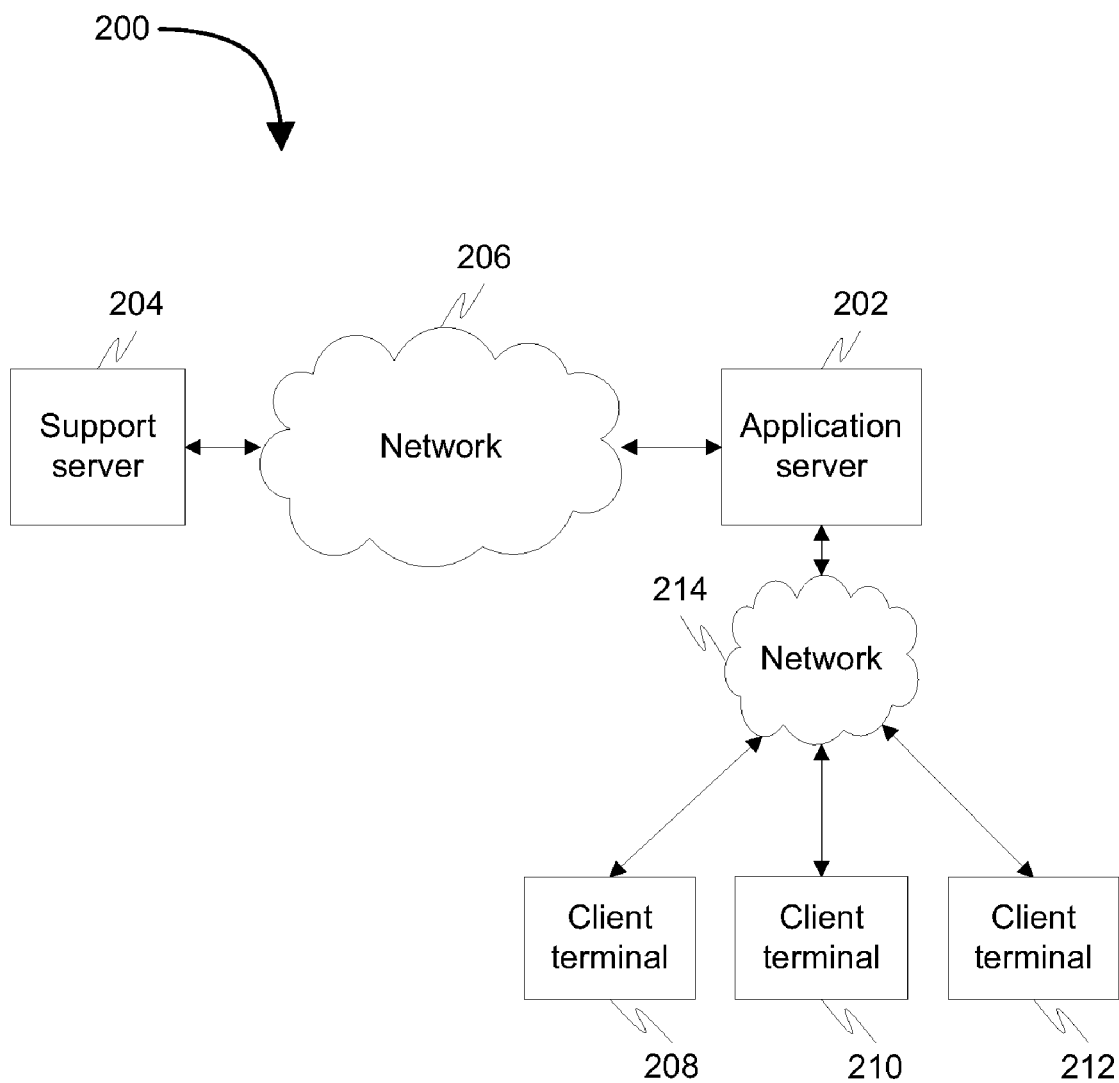
FIG. 2 is a block diagram showing a system for providing support for software application over a communication system, in accordance with an embodiment of the invention.

FIG. 2 is a block diagram showing a system 200 for providing support for Java™ based software application over a communication system, in accordance with an embodiment of the invention. The Java™ based software application has a plurality of instances in the business enterprise. The Java™ based software application may be an enterprise software application. System 200 includes an application server 202, which is located at a business enterprise and a support server 204, which is located at a support center. Application server 202 communicates with support server 204 over a network 206. Examples of network 206 may include, but are not limited to, a LAN, a WAN, an intranet, WiMAX, WiFi, and the internet.

Application server 202 includes one or more instances of the Java™ based software application. Each instance of the Java™ based software application corresponds to an operating environment in the business enterprise and addresses objectives specific to the corresponding operating environment. An instance of the Java™ based software application includes classes associated with the corresponding operating environment. Application server 202 is further explained in detail in conjunction with FIG. 3. One or more end-users communicate with application server 202 through client terminal 208, client terminal 210, and client terminal 212 over a network 214 to access one or more instances of the Java™ based software application. Examples of network 214 may include, but are not limited to, a LAN, a WAN, an intranet, WiMAX, WiFi, and the internet. One or more of end-users may issue a support request for one or more instances of the Java™ based software application. The support request may be one or more of, but is not limited to a bug report, a patch requirement, and an enhancement requirement in one or more instances of the Java™ based software application.

In response to the support request, remote support personnel at the support center initiate a request for a first attribute-list for an instance of the Java™ based software application through support server 204, in response to the support request. The request initiated by the remote support personnel, for example, may be a, HTTP request. The request for the first attribute-list may be initiated by one or more of remote support personnel, on-site personnel, and one or more end-users through one or more of client terminal 208, client terminal 210, and client terminal 212. In response to the request, application server 202 sends the first attribute-list based on an operating environment of the instance of the Java™ based software application over network 206. The first attribute-list includes attributes corresponding to a first plurality of classes used by the instance of the Java™ based software application. The first plurality of classes is associated with the operating environment of the instance of the Java™ based software application. The attributes corresponding to a class in the first plurality of classes includes one or more of the name of the class, the version number of the class, the configuration information corresponding to the class, the date of last modification of the class, size of the class, and the name of the user modifying the class.

The first attribute-list is received by support server 204 over network 206 in response to the request for the first attribute-list. Thereafter, the first attribute-list is compared with a second attribute-list stored on support server 204. The second attribute-list includes attributes corresponding to a second plurality of classes. The second plurality of classes is stored on a server of the vendor of the Java™ based software application. The second plurality of classes is associated with the operating environment of the instance. Therefore, each of the first plurality of classes and the second plurality of classes correspond to same instance of the Java™ based software application. The second plurality of classes may include the first plurality of classes. Alternately, the number of classes in the second plurality of classes may be equal to the number of classes in the first plurality of classes.

Based on the comparison between the first attribute-list and the second attribute-list, support server 204 displays a diagnostic report for the instance of the Java™ based software application. The diagnostic report includes attribute-dissimilarity of one or more classes and names of one or more classes that are absent in the first plurality of classes. The second plurality of classes includes the absent classes. An attribute-dissimilarity of a class corresponds to difference in attributes of the class in the second attribute-list from the attributes of the class in the first attribute-list. This is further explained in detail in conjunction with FIG. 5.

Figure 3:
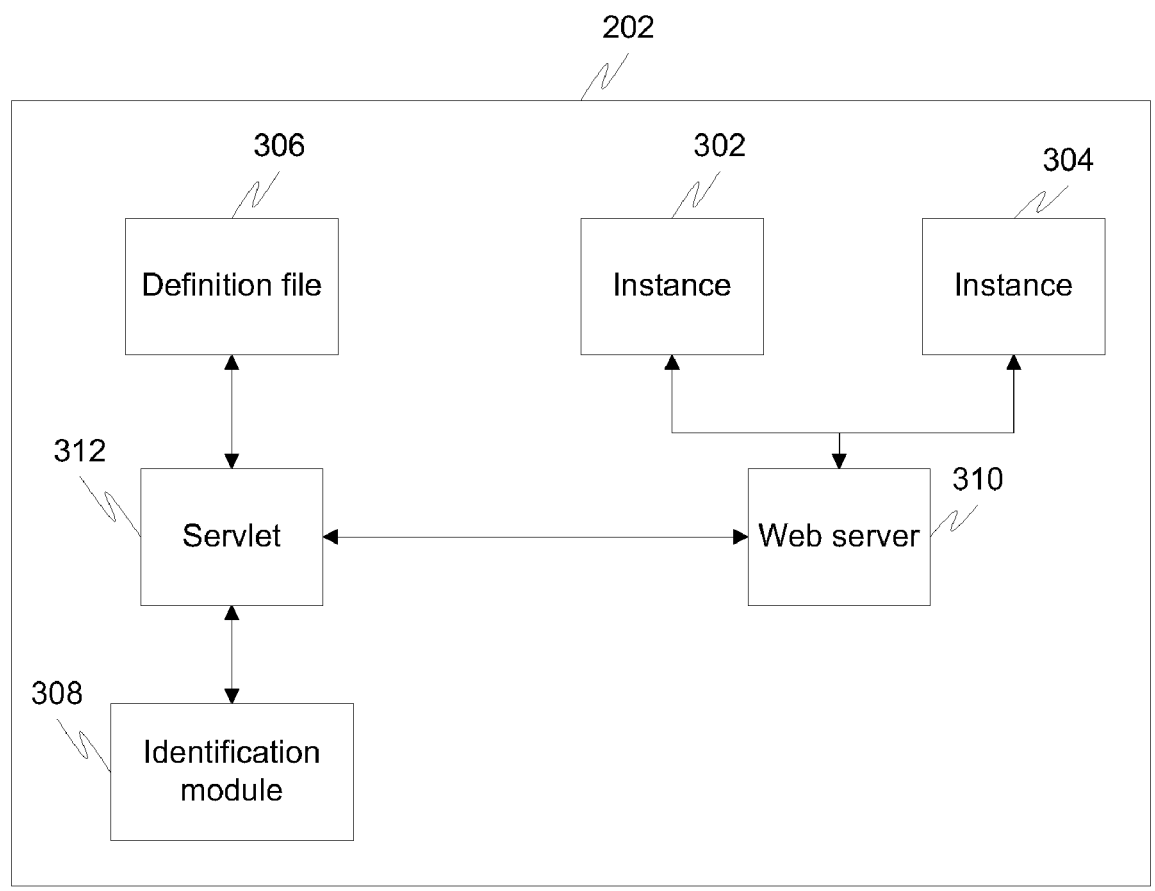
FIG. 3 is a block diagram showing various components of application server, in accordance with an embodiment of the invention.

FIG. 3 is a block diagram showing various components of application server 202, in accordance with an embodiment of the invention. Application server 202 includes an instance 302 of the Java™ based software application, an instance 304 of the Java™ based software application, a definition file 306 and an Identification module 308. It will be apparent to a person skilled in the art that application server 202 may include more than two instances of the Java™ based software application. In this embodiment of the invention, the first plurality of classes is used by instance 302 of the Java™ based software application. Instance 302 corresponds to a first operating environment of the business enterprise and instance 304 corresponds to a second operating environment of the business enterprise. It will be apparent to a person skilled in the art that the business enterprise may have more than two operating environments.

Definition file 306 includes names of one or more operating environments for the Java™ based software application present at the business enterprise. Definition file 306 further includes path names for each operating environment. A path name of an operating environment is the location of the operating environment in the memory of application server 202. In this embodiment, definition file 306 includes the name and the path name of each of the first operating environment and the second operating environment of the business enterprise. Definition file 306 is created by the vendor of the Java™ based software application when the Java™ based software application is installed in application server 202. When a new operating environment is created at the business enterprise, the on-site support personnel modifies definition file 306 to add the name and the path name of the new operating environment in definition file 306. In an exemplary embodiment of the invention, definition file 306 may be represented as (1).

| Name of operating environments | Path name | |
|---|---|---|
| UAT | \user1\web\uat\es | . . . 1 |
| Support | \user1\web\support\es | |
| Production | \user1\web\production\es | |
| Data Migration | \user1\web\datmigrat\es | |

Referring back to FIG. 2, the request initiated by the remote support personnel for the first attribute-list through support server 204 is received by a web server 310 in application server 202. Thereafter, web server 310 communicates the request to a servlet 312, which is configured to handle HTTP requests that are in HTML format. Servlet 312 sends and receives HTTP messages. In an embodiment of the invention, the HTTP messages are in HTML format. In another embodiment of the invention, the HTTP messages are in one of Microsoft® Excel format, Microsoft® Word format, XML format, and text file format. It will be apparent to a person skilled in the art that application server 202 may include more than one servlet. Each servlet is configured to handle a different type of HTTP request. Additionally, web server 310 receives one or more of a request for invoking identification module 308 and a request for reading definition file 306. Thereafter, web server 310 communicates the request to servlet 312, which reads definition file 306 and invokes identification module 308 in response to the corresponding request received from web server 310.

After servlet 312 receives the request for the first attribute-list, servlet 312 parses the request to determine if the request includes a keyword corresponding to one of the operating environments for the business enterprise, i.e., the first operating environment and the second operating environment. If the name of one of the first operating environment and the second operating environment is absent in the request, then servlet 312 reads definition file 306 and sends the names of operating environments present in definition file 306 to the remote support personnel as an HTML input form. The remote support personnel then select the first operating environment from the operating environments displayed on support server 204. Thereafter, the remote support personnel communicate a request that includes the name of the first operating environment to web server 310 from support server 204. Web server 310 communicates the request to servlet 312. Then servlet 312 invokes identification module 308 in response to the request communicated from web server 310. The method corresponding to this is further explained in conjunction with FIG. 6.

However, if the request includes the name of one of the first operating environment and the second operating environment, servlet 312 invokes identification module 308 along with the name of one of the first operating environment and the second operating environment in response to the request communicated from web server 310. As the request includes the name of the first operating environment of instance 302, identification module 308, when invoked, reads definition file 306 to access information of the first operating environment and generates the first attribute-list. Servlet 312 then formats the first attribute-list in a predefined format and sends it to support server 204 through web server 310. This is further explained in detail in conjunction with FIG. 6 and FIG. 7.

Additionally, web server 310 may receive a request to invoke one or more of instance 302 and instance 304 from one or more of end-users through client terminal 208, client terminal 210, and client terminal 212 over network 214. In response to the request, web server 310 invokes one or more of instance 302 and instance 304, such that the service provided by instance 302 and instance 304 can be accessed by one or more of the end-users.

Figure 4:
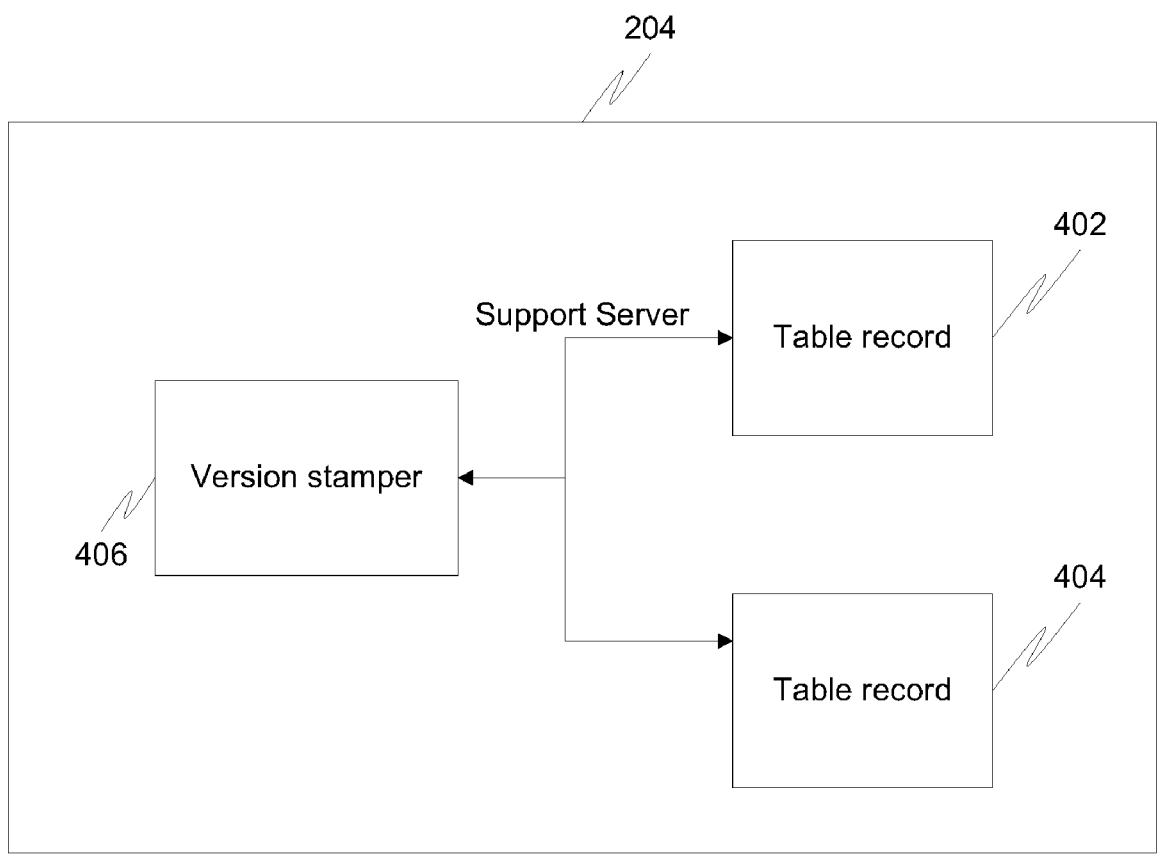
FIG. 4 is a block diagram showing a system for updating a second attribute-list in support server, in accordance with an embodiment of the invention.

FIG. 4 is a block diagram showing various components of support server 204, in accordance with an embodiment of the invention. Support server 204 includes a table record 402, a table record 404, and a version stamper 406. It will be apparent to a person skilled in the art that support server 204 may include more than two table records.

Each of table record 402 and table record 404 corresponds to a business enterprise and includes class attribute information for the corresponding business enterprise. The information in a table record corresponds to instances of a Java™ based software application in the corresponding business enterprise. A table record, for example may be a Microsoft® Excel worksheet or a database. In this embodiment of the invention, table record 402 corresponds to the business enterprise that uses application server 202. Table record 402 includes information associated with instance 302 and instance 304 of the Java™ based software application installed at the business enterprise using application server 202. Therefore, table record 402 stores the second attribute-list, which stores attributes of the second plurality of classes associated with the first operating environment of instance 302.

When a vendor of the Java™ based software application modifies one or more classes in the second plurality of classes and/or adds one or more classes to the second plurality of classes, the second attribute-list in table record 402 is updated. To update table record 402 such that the second attribute-list in table record 402 includes attributes corresponding to one or more classes in the second plurality of classes that are modified and one or more new classes that are added to the second plurality of classes the vendor of the Java™ based software application invokes version stamper 406. Version stamper may be present in a development area of the vendor of the Java™ based software application.

Version stamper 406 determines attributes of each class in the second plurality of classes, if a class in the second plurality of classes is modified and if a class is added to the second plurality of classes. Version stamper 406 determines the attributes of a class from a corresponding Javadoc, which is created by a vendor of a Java™ based software application that creates or modifies the class. This is further explained in detail in conjunction with FIG. 7. A Javadoc for a class includes a plurality of tags, which include a @version tag, a @latestversion tag, and a @author tag. The @version tag points to a list of each version number assigned to the class, which is the amendment history of the class. The @author tag points to the name of the user who created the class. Further, the @latestversion tag for the class points to the latest version of the class. In an exemplary embodiment of the invention, each of a @version tag and a @latestversion tag of a class may be represented as (2):

$$
\begin{array}{ll}
@\text{version} & 1.2 \\
 & 1.3 \\
 & 1.4 \quad \ldots (2) \\
@\text{latestversion} & 1.5
\end{array}
$$

where,
   1.2, 1.3, and 1.4 are the version numbers that were assigned to the class; and
   1.5 is the latest version assigned to the class.

After determining the attributes, version stamper 406 stores the attributes determined from a Javadoc of a class in the second plurality of classes into a manifest.mf file.

Thereafter, version stamper 406 adds the attributes of each class in the second plurality of classes that is modified and each class that is added to the second plurality of classes, in the second attribute-list in table record 402. Thereafter, version stamper 406 sends table record 402, which has been updated, to the remote support personnel. This is further explained in detail in conjunction with FIG. 7.

Figure 5:
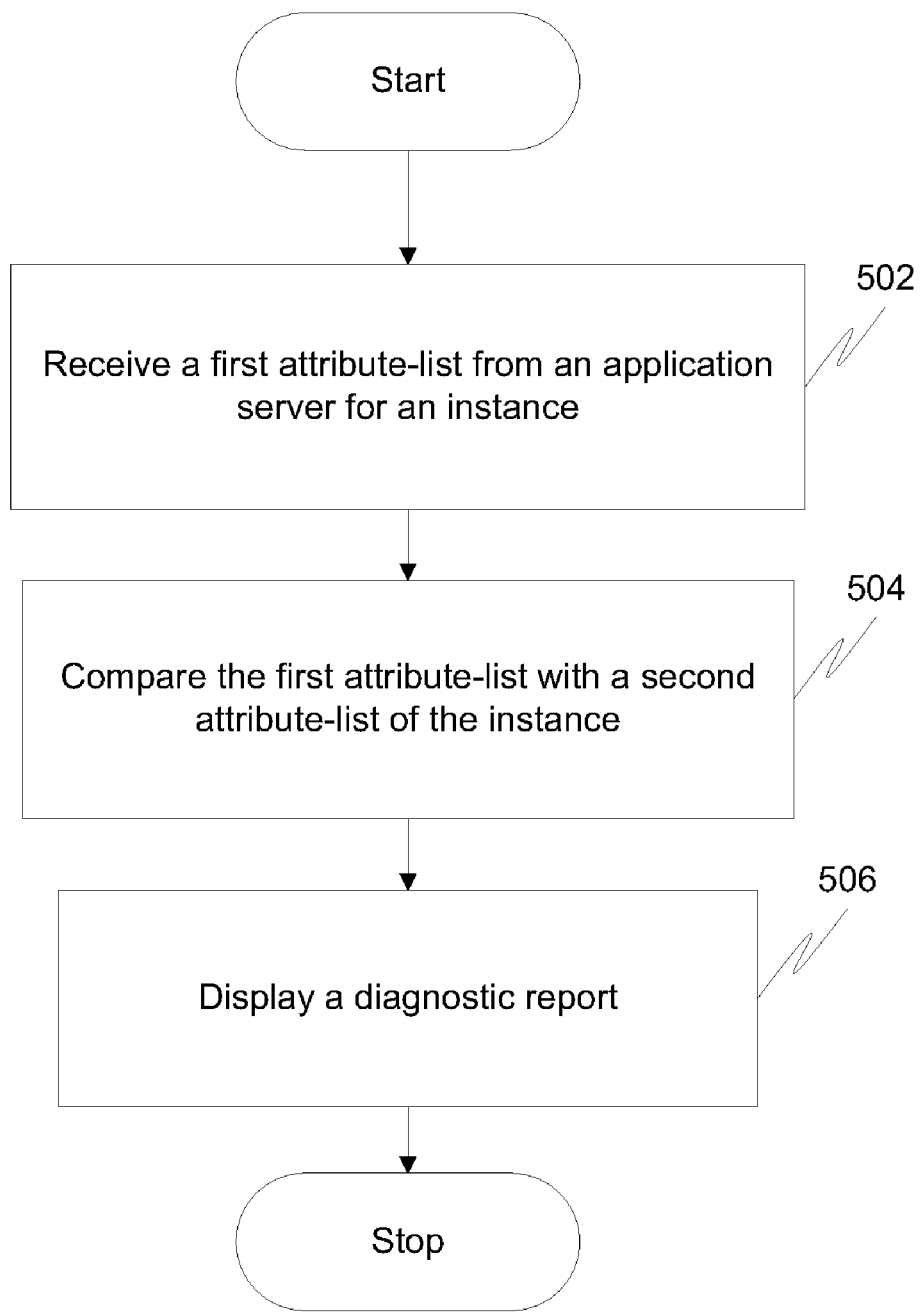
FIG. 5 is a flowchart of a method for providing support for a software application over a communication system, in accordance with an embodiment of the invention.

FIG. 5 is a flowchart of a method for providing support for a Java™ based software application over a communication system, in accordance with an embodiment of the invention. The software application may be an enterprise software application. In response to the support request for instance 302, the remote support personnel at support server 204 initiates a request to application server 202 for the first attribute-list that corresponds to instance 302. The request is an HTTP request. The first attribute-list includes attributes corresponding to the first plurality of classes used by instance 302 of the Java™ based software application. The first plurality of classes is associated with the first operating environment. In an embodiment of the invention, the request for the first attribute-list is initiated by one or more of remote support personnel, on-site support personnel, and one or more end-users, through one or more of client terminal 208, client terminal 210, and client terminal 212. In response to the request, identification module 308 generates the first attribute-list and communicates the first attribute-list to web server 310 through servlet 312. Thereafter, web server 310 sends the first attribute-list to support server 204. In an embodiment of the invention, web server 310 sends the first attribute-list to one or more of remote support personnel, on-site support personnel, and one or more end-users at one or more of client terminal 208, client terminal 210, and client terminal 212. This is further explained in detail in conjunction with FIG. 6.

At step 502, support server 204 receives the first attribute-list from application server 202. The first attribute-list includes attributes corresponding to the first plurality of classes. Attributes corresponding to a class includes one or more of the name of the class, the version number of the class, the configuration information corresponding to the class, the date of last modification of the class, size of the class, and the name of the user modifying the class.

Thereafter, at step 504, the first attribute-list is compared with the second attribute-list, which is stored in table record 402 at support server 204. The second plurality of classes is associated with the first operating environment. The second plurality of classes is updated by a vendor of the Java™ based software application. The second plurality of classes is updated if a class in the second plurality of classes is modified and/or a class is added to the second plurality of classes by the vendor of the Java™ based software application. As the second plurality of classes is updated, therefore the second attribute-list stored at support server 204 is updated accordingly. This ensures that the second attribute-list represents the latest attribute of each class in the second plurality of classes. This is further explained in detail in conjunction with FIG. 7. The second plurality of classes may include the first plurality of classes. Alternately, the number of classes in the second plurality of classes may be equal to the number of classes in the first plurality of classes.

The first attribute-list is compared with the second attribute-list to determine if the attributes of each class in the first plurality of classes used by instance 302 and the attributes of each class in the second plurality of classes is similar. Additionally, based on the comparison the first attribute-list and the second attribute-list, it is determined if one or more classes in the second plurality of classes is absent in the first plurality of classes. For example, for a class, version attribute of the class in the first attribute-list may be compared with version attribute of the class in the second attribute-list. Additionally, the number of classes in the first attribute-list may be compared with the number of classes in the second attribute-list, to determine if one or more classes in the second plurality of classes is absent in the first plurality of classes.

At step 506, a diagnostic report for the instance of the Java™ based software application is displayed to remote support personnel based on the comparison between the first attribute-list and the second attribute-list. The diagnostic report includes attribute-dissimilarity of one or more classes and names of one or more classes that are absent in the first plurality of classes and present in the second plurality of classes. If based on the comparison between the first attribute-list and the second attribute-list, it is determined that the attribute of a class in the first attribute-list is different from the attribute of the class in the second attribute-list, then the diagnostic report includes an attribute-dissimilarity of the class. The attribute-dissimilarity corresponds to difference in the attributes of the class in the second attribute-file from the attributes of the class in the first attribute-file. For example, the latest version attribute corresponding to a class in the first attribute-list has a value 1.2, and the latest version attribute corresponding to the class in the second attribute-list has a value 2.0. Therefore, based on the comparison it is determined that the latest version of the class in the first plurality of classes is older than the latest version of the class in the second plurality of classes. Accordingly, the attribute-dissimilarity of the class in the diagnostic report corresponds to the dissimilarity in version numbers of the class given in the first attribute-list and the second attribute-list.

Alternately, if based on the comparison between the first attribute-list and the second attribute-list, it is determined that a class in the second plurality of classes is absent in the first plurality of classes, then the diagnostic report includes the name of the class that is absent in the first plurality of classes and is present in the second plurality of classes.

The diagnostic report may be used by the vendor of the Java™ based software application to determine any discrepancy between the classes present in the second plurality of classes and those present in the corresponding instance of the Java™ based software application. This report enables support personnel to determine if there is a requirement of a bug fix and/or enhancements for that particular instance of the Java™ based software application by eliminating the possibility of a reported error being caused by the absence of a class or the presence of an incorrect version of a class in the corresponding instance.

Figure 6A:
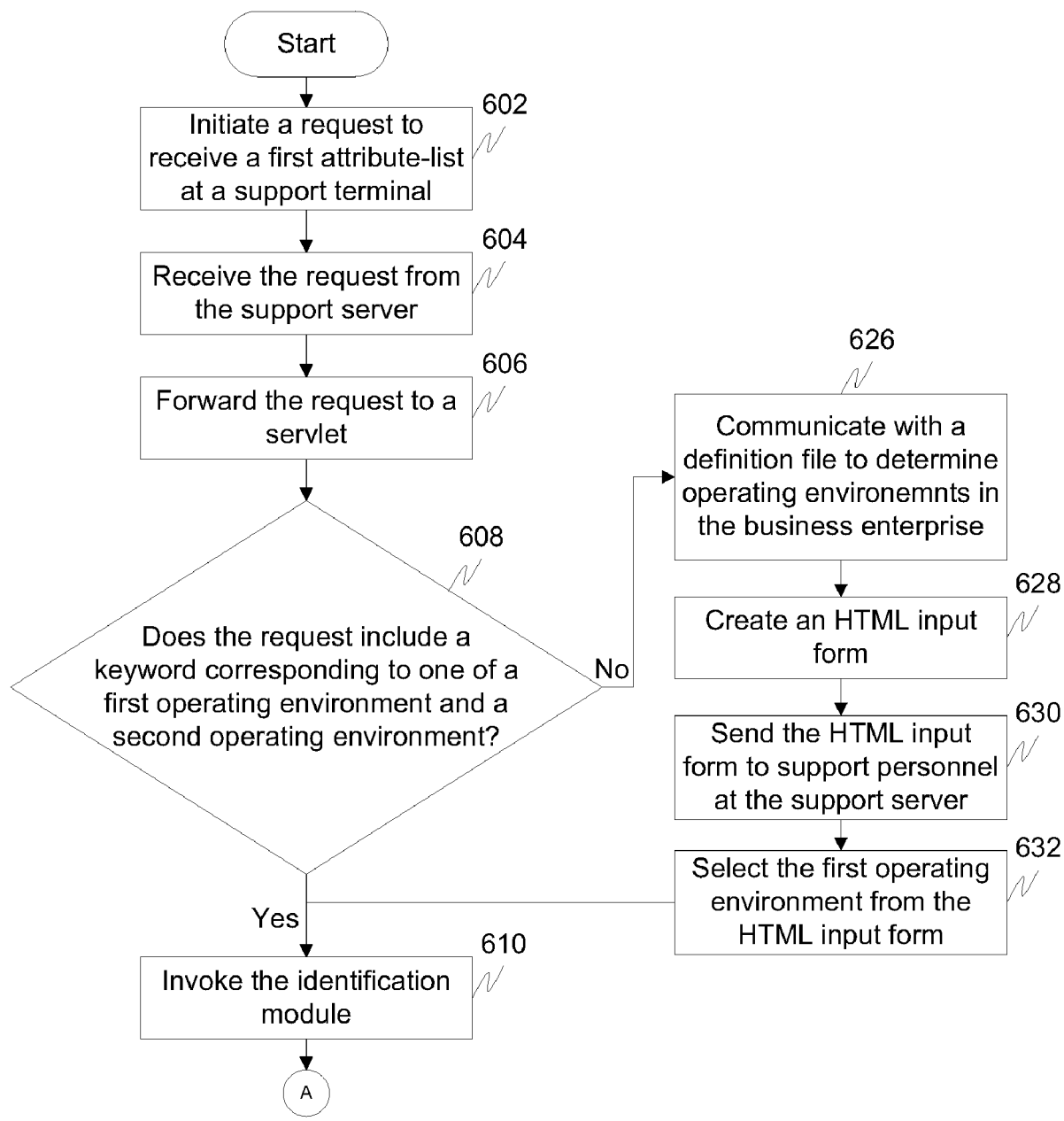
FIGS. 6A and 6B show a flowchart of a method for receiving the first attribute-list from an application server, in accordance with an embodiment of the invention.
Figure 6B:
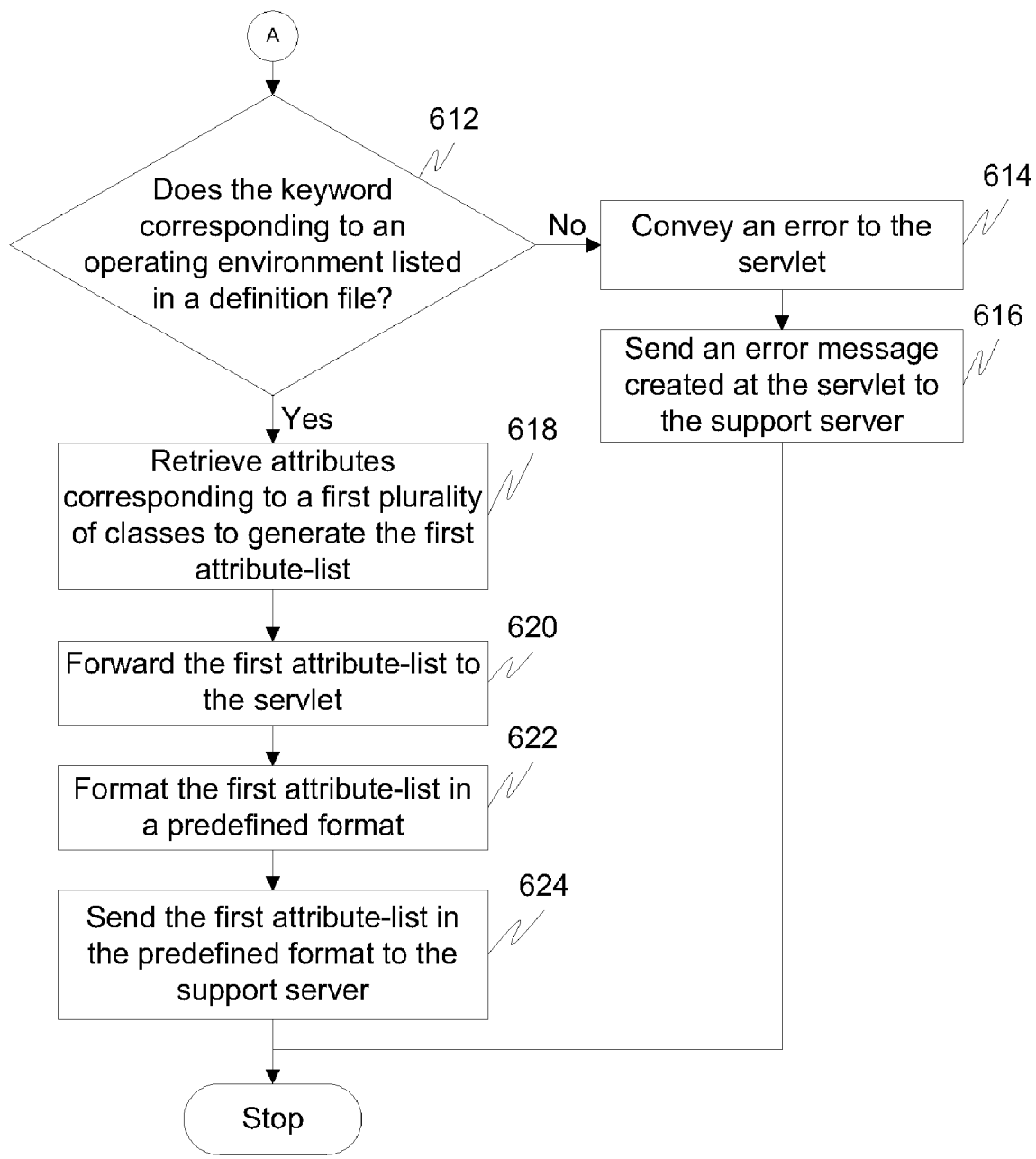

FIGS. 6A and 6B show a flowchart of a method for receiving the first attribute-list from application server 202, in accordance with an embodiment of the invention. The first attribute-list is received corresponding to the first operating environment of instance 302. At step 602, the remote support personnel initiate a request at support server 204 to application server 202 over network 206. The request initiated by the remote support personnel is an HTTP request in an HTML format. The request is initiated to receive the first attribute-list from application server 202. The request includes an address, for example, a URL, of identification module 308. Additionally, the request may include a keyword corresponding to the first operating environment of instance 302. Alternately, the request may include a keyword corresponding to the second operating environment of instance 304. In an exemplary embodiment of the invention, application server 202 is located at a business enterprise ABC. In this case, the request issued to identification module 308 in application server 202 for the first attribute-list is represented as (2).

http://www.ABC.com/es/versions/?envname=UAT ... (2)
where,
"http://www.abc.com/es/versions" is the URL assigned to identification module 308 located at the business enterprise ABC, and
"UAT" is a keyword representing the operating environment UAT.

At step 604, web server 310 receives the request from support server 204. Web server 310 parses the request to identify a module in application server 202 that has been requested. Thereafter, web server 310 forwards the request to a servlet that is configured to handle the format of the request. As the request is in HTML format, therefore, at step 606, web server 310 forwards the request to servlet 312.

At step 608, servlet 312 parses the request received from web server 310 to determine if the request includes a keyword corresponding to one of the first operating environment and the second operating environment. If a keyword corresponding to one of the first operating environment and the second operating environment is present in the request, at step 610, servlet 312 parses the request and invokes the identification module 308, along with the name of the first operating environment as a keyword.

Thereafter, at step 612, identification module 308 performs a check to determine if the keyword in the request corresponds to operating environments listed in definition file 306, i.e., the first operating environment and the second operating environment. If the keyword does not correspond to one of the first operating environment and the second operating environment, identification module 308 conveys an error to servlet 312, at step 614. At step 616, servlet 312, creates an error message and sends the error message to support server 204 as an HTTP response through web server 310. In an embodiment of the invention, the error message may be an HTML page.

Referring back to step 612, if the keyword corresponds to one of the first operating environment and the second operating environment, then identification module 308 retrieves attributes corresponding to classes associated with an operating environment of an instance of the Java™ based software application present in the request. For this, identification module 308 reads definition file 306 to determine the path of the operating environment. As the request includes a keyword corresponding to the first operating environment, therefore, at step 618, identification module 308 retrieves attributes corresponding to the first plurality of classes associated with the first operating environment of instance 302 to generate the first attribute-list. For this, identification module 308 reads definition file 306 to determine the path of the first operating environment. Thereafter, identification module 308 retrieves attributes corresponding to the first plurality of classes by reading a manifest.mf file associated with each JAR file in each module of instance 302.

At step 620, identification module 308 forwards the first attribute-list to servlet 312. Servlet 312 formats the first attribute-list in the predefined format, at step 622. The predefined format may be, formatting the first attribute-list in a tabular format. Thereafter, at step 624, servlet 312 sends the first attribute-list in the predefined format to support server 204 through web server 310. The first attribute-list may be sent as an HTTP response to support server 204. The first attribute-list is then displayed to the remote support personnel at support server 204 in the predefined format. The first attribute-list is compared with the second attribute-list stored in the table record 402, and a diagnostic report is displayed to the remote support personnel at support server 204.

Referring back to step 608, if a keyword corresponding to one of the first operating environment and the second operating environment is absent, at step 626, servlet 312 reads definition file 306 to determine operating environments in the business enterprise. Thereafter, at step 628, servlet 312 creates an HTML input form that includes names of each operating environment in the business enterprise listed in definition file 306, i.e., the first operating environment and the second operating environment. Servlet 312 sends the HTML input form to the remote support personnel at support server 204 as an HTTP response, at step 630. In response to receiving the HTML input form, at step 632, the remote support personnel at support server 204 selects the first operating environment. This selection is sent as HTTP request to servlet 312. Thereafter, step 610 to step 624 are performed.

In an embodiment of the invention, if the request is initiated by one of remote support personnel, on-site support personnel, and one or more end-users through one or more of client terminal 208, client terminal 210, and client terminal 212, to the application server 202 through network 214, then servlet 312 sends the first attribute-list in the predefined format to one of remote support personnel, on-site support personnel, and one or more end-users, that has initiated the request. In this case, one of remote support personnel, on-site support personnel, and one or more end-users that initiate the request, invoke the identification module along with the operating environment selected from a list that includes the names of the first operating environment and the second operating environment. Thereafter, one of the remote support personnel, on-site support personnel, and one or more end-users can save the first attribute-list in a file and send it via e-mail to the remote support personnel at support server 204. Finally, the first attribute-list is compared with the second attribute-list and a diagnostic report is generated.

Figure 7:
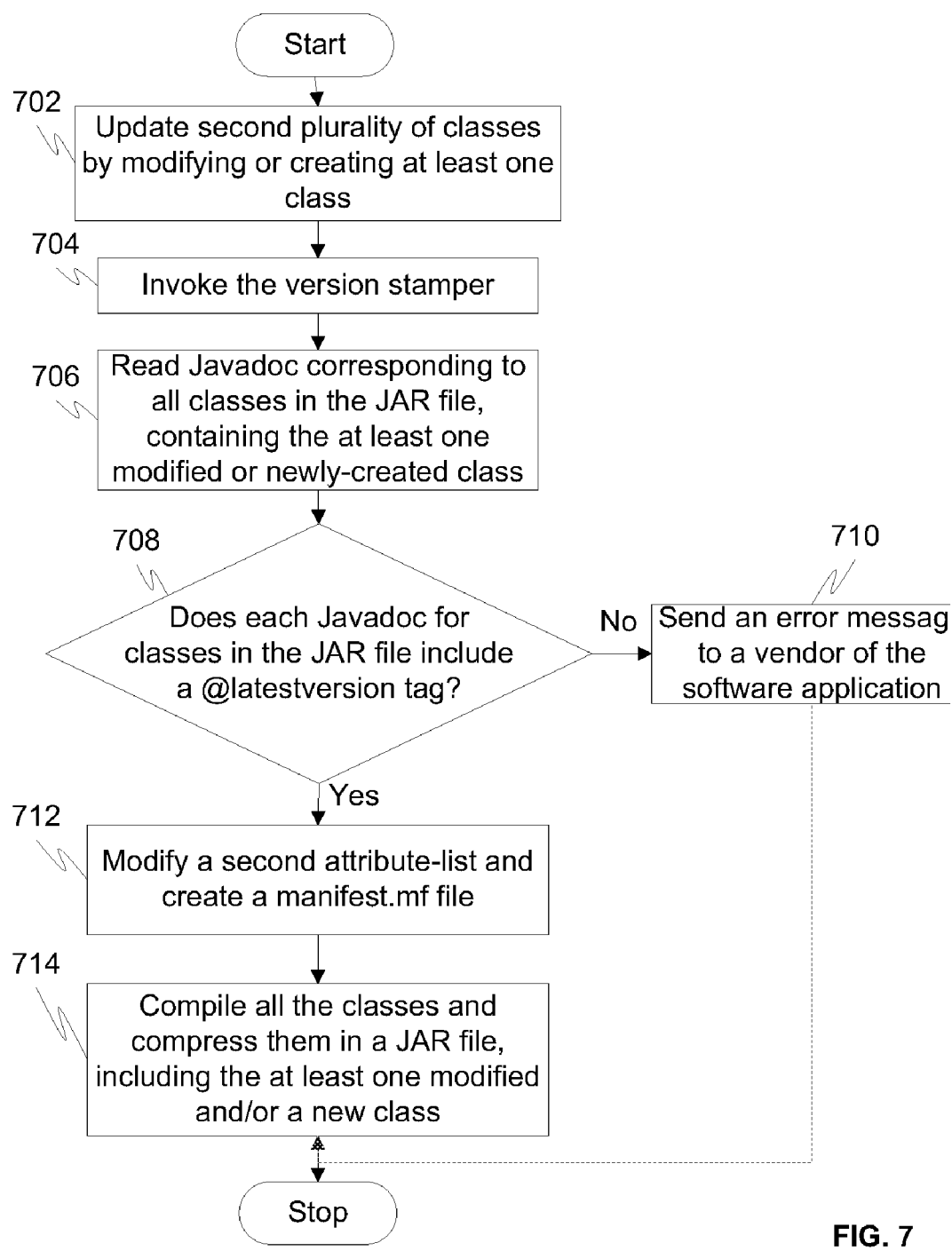
FIG. 7 is a flowchart of a method for updating the second attribute-list in table record, in accordance with an embodiment of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

FIG. 7 is a flowchart of a method for updating the second attribute-list in table record 402, in accordance with an embodiment of the invention. The second attribute-list includes attributes corresponding to the second plurality of classes associated with the first operating environment. The second attribute-list is updated each time the vendor of the Java™ based software application updates the second plurality of classes. The second attribute-list is updated by modifying attributes corresponding to a class in the second plurality of classes that is modified and by adding attributes of a class that is added to the second plurality of classes. The vendor of the Java™ based software application updates the second plurality of classes in order to rectify bugs in the Java™ based software application. The second plurality of classes may be updated to enhance features of the Java™ based software application.

At step 702, the vendor of the Java™ based software application updates the second plurality of classes by modifying one or more classes in the second plurality of classes, or by adding one or more classes to the second plurality of classes.

To update the second attribute-list based on the updates of the second plurality of classes, at step 704, the vendor of the Java™ based software application invokes version stamper 406. The vendor of the Java™ based software application provides the address/path of one or more classes that have been updated and the address/path of each class in a JAR file associated with one or more classes that have been updated. Thereafter, at step 706, version stamper 406 reads the Javadoc corresponding to one or more classes that have been updated and the Javadoc of each class in a JAR file associated with one or more classes that have been updated.

At step 708, version stamper 406 performs a check to determine if a Javadoc corresponding to one or more classes that have been updated and each class of the JAR file, for which one or more classes are updated, includes a @latestversion tag. If the @latestversion tag is absent, version stamper 406 displays an error message to the vendor of the Java™ based software application, at step 710 for a class that does not include a @latestversion tag in a corresponding Javadoc. Additionally, version stamper 306 sends the path name of the class that does not include a @latestversion tag in a corresponding Javadoc Referring back to step 708, if a Javadoc corresponding to each class that has been updated and each class of the JAR file, for which one or more classes are updated, includes a @latestversion tag, version stamper 406 extracts the attributes of each class in the JAR file containing the modified or newly-created class. Thereafter, version stamper 406 updates the second attribute-list in table record 402 and a manifest.mf file for the JAR file accordingly, at step 712.

To update the manifest.mf file, version stamper 406 creates the manifest.mf file and adds attributes of each class that has been updated and attributes of each class of the JAR file, for which one or more classes are updated, to the manifest.mf file. For example, a module of instance 302 includes a JAR file. The JAR file further includes a first class, a second class, and a third class. A vendor of the software application modifies one or more attributes of the first class. Thereafter, the vendor of the software application invokes version stamper 406, which extracts attributes of each of the first class, the second class, and the third class from the corresponding Javadoc. Version stamper 406 creates a new manifest.mf file for the JAR file and stores attributes of each of the first class, the second class, and the third class in the new manifest.mf file. By way of another example, a fourth class may be added to the JAR file. In this case, version stamper 406 extracts attributes of the first class, the second class, the third class, and the fourth class from the corresponding Javadoc and store the attributes in the manifest.mf file.

Version stamper 406 updates the second attribute-list in table record 402 based on the path name of the table record 402 provided by the vendor of the software application. The second attribute-list is updated, such that, it includes attributes corresponding to one or more classes that are updated in the second plurality of classes, i.e., one or more classes in the second plurality of classes that are modified and/or one or more classes that are added to the second plurality of classes. Table record 402 is then sent to the remote support personnel.

At step 714, the vendor compiles all the classes and compress them in a JAR file, along with the corresponding manifest.mf file. The classes in the JAR file includes one or more classes in the second plurality of classes that are modified and/or one or more classes that are added to the second plurality of classes. The manifest.mf file includes the name and attributes corresponding to each class in the JAR file. For example, each of the first class, the second class, and the third class are compiled in the JAR file. The JAR file also includes the new manifest.mf file, which includes attributes corresponding to the first class, the second class, and the third class.

Various embodiments of the invention provide methods and systems for providing support to Java™ based software applications. A Java™ based software application has a plurality of instances installed at the application server. The Java™ based software application may be an enterprise software application. One or more instances of the Java™ based software application installed at an application server are diagnosed remotely from a support server. Thereafter, a diagnostic report for an instance is displayed at the support server. The vendor of the Java™ based software application may use the diagnostic report to determine any discrepancy between the classes in the second plurality of classes and those present in the corresponding instance of the Java™ based software application.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of providing remote support for a plurality of instances of a Java™ based software application, wherein each instance is modified to include corresponding classes for meeting the requirements of one of a plurality of operating environments, the method being performed in a support server communicatively coupled to the application server by a network, the method comprising:

maintaining, in said support server, a plurality of sets of attribute lists, each set of attribute list corresponding to one of the plurality of operating environments and indicates the expected attributes of the classes used by the instance corresponding to the one operating environment;

receiving, in said support server, a first attribute-list from the application server, the first attribute list corresponding to a first operating environment for which an instance of the Java™ based software application is deployed in the application server, wherein the first attribute-list comprises attributes corresponding to a first plurality of classes currently used by the instance of the Java based software application, the first plurality of classes being used by the instance of the Java™ based software application while being deployed in said application server;

said support server receives said first attribute list from said application server on said network;

identifying, in said support server, a second attribute list of the plurality of sets of attribute lists corresponding to the first operating environment;

comparing, in said support server, the attributes of the second attribute-list with those of the first attribute-list, wherein the second attribute-list comprises attributes corresponding to a second plurality of classes associated with the first operating environment; and sending for displaying, by said support server, a diagnostic report for the instance of the Java™ based software application based on the comparison between the second attribute-list and the first attribute-list, said diagnostic report indicating the results of comparing the attributes of the first attribute list with those in the second attribute list.

2. The method of claim 1, wherein the diagnostic report comprises at least one of:

attribute dissimilarity of at least one class, wherein attribute dissimilarity of at least one class corresponds to difference in attributes of the at least one class in the second attributes-list from attributes of the at least one class in the first attribute-list; and name of at least one class, wherein the at least one class is absent in the first plurality of classes, the second plurality of classes comprises the at least one class.

3. The method of claim 2, wherein the second plurality of classes is updated by the vendor of the Java™ based software application based on predefined criteria.

4. The method of claim 3, wherein the predefined criteria is at least one of:

at least one class in the second plurality of classes being modified; and at least one class being added to the second plurality of classes.

5. The method of claim 4, wherein the second attribute-list is updated each time the vendor of the Java™ based software application updates the second plurality of classes, the second attribute-list is updated by modifying attributes corresponding to a class being modified and adding attributes of a class being added to the second plurality of classes, whereby the diagnostic report indicates whether the instance deployed in the application server also contains the updated classes.

6. The method of claim 5, wherein the attribute corresponding to each of a class being modified and a class being added is obtained from a Javadoc associated with the corresponding class, a Javadoc for a class is created by the vendor of the Java based software application, the Javadoc comprises a plurality of tags for the class.

7. The method of claim 6, wherein the plurality of tags for a class comprises a @latestversion tag, wherein the @latestversion tag corresponds to the latest version of the class.

8. The method of claim 6, wherein attributes obtained from a Javadoc of a class are stored in a manifest.mf file associated with a JAR file of the class.

9. The method of claim 1, wherein attributes corresponding to a class comprises:
the name of the class;
the version of the class;
configuration information corresponding to the class;
the date of last modification of the class;
the size of the class; and
the name of the user modifying the class.

10. The method of claim 1 further comprising initiating a request for the first attribute-list.

11. The method of claim 10, wherein remote support personnel initiate the request for the first attribute-list through the support server,
wherein the support server sends a request for the first attribute-list to the application server over the network and receives the first attribute list as a response from the application server.

12. The method of claim 11, wherein the support server is designed to specify an operating environment of interest in the request,
wherein the application server is designed to send the attribute list corresponding to the specified operating environment, for the support server to generate the diagnostic report for the specified operating environment for which the instance of the Java based software application is deployed on the application server.

13. The method of claim 12, wherein the application server is designed to send the names of operating environments for which respective instances of the Java based software application is deployed.

14. The method of claim 13, wherein the application server sends the names of operating environments as a response if there is no instance deployed corresponding to the operating environment specified in the request.

15. The method of claim 13, wherein the plurality of environments include User Acceptance Testing (UAT) environment, Support environment, production environment, and data migration environment such that the respective modified instance contains the corresponding set of classes to meet the requirements of the corresponding environment.

16. The method of claim 1, wherein the second plurality of classes is stored on a server of the vendor of the Java based software application.

17. A system for providing support to a Java™ based software application having a plurality of instances, the system comprising:
an application server configured to send a first attribute-list over on a network to a support server, the first attribute list corresponding to a first operating environment for which an instance of the Java™ based software application is deployed in the application server, wherein the first attribute-list comprises attributes corresponding to a first plurality of classes currently used by the instance of the Java™ based software application in the application server, the first plurality of classes being used by the instance of the Java™ based software application while being deployed in said application server, said support server receives said first attribute list from said application server on said network; and
a support server communicating with the application server on the network, wherein the support server is configured to:
maintain a plurality of sets of attribute lists, each set of attribute list corresponding to one of the plurality of operating environments and indicates expected attributes of the classes used by the instance corresponding to the one operating environment;
receive the first attribute list on the network from said application server;
identify, in response to receiving of the first attribute list, a second attribute list of the plurality of sets of attribute lists corresponding to the first operating environment;
compare the attributes of the second attribute-list with those of the first attribute-list, wherein the second attribute-list comprises attributes corresponding to a second plurality of classes associated with the first operating environment; and
send for display a diagnostic report for the instance of the Java™ based software application based on the comparison between the first attribute-list and the second attribute-list, said diagnostic report indicating the results of comparing the attributes of the first attribute list with those in the second attribute list such that the diagnostic report;
wherein each of the application server and the support server comprises at least one processor and a memory, wherein the processor retrieves and executes the instructions from the memory.

18. The system of claim 17 further comprising a plurality of end-users communicating with the application server to access an instance of the Java based software application.

19. The system of claim 17, wherein the application server comprises:
at least one instance of the Java™ based software application, wherein an instance of the Java based software application corresponds to an operating environment;
a definition file, wherein the definition file comprises names of at least one operating environment for the Java™ based software application; and
an identification module, wherein the identification module generates the first attribute-list.

20. The system of claim 19 further comprising:
a web server, wherein the web server is configured to:
communicate a request for reading the definition file;
communicate a request for invoking the identification module; and
invoke the at least one instance of the Java™ based software application in response to receiving a corresponding request; and
at least one servlet, wherein a servlet is configured to:
read the definition file in response to a corresponding request received from the web server;
invoke the identification module in response to a corresponding request received from the web server;
format the first attribute-list in a predefined format; and
send the first attribute-list in the predefined order to the support server through the web server.

21. The system of claim 17, wherein the support server comprises at least one table record, wherein a table record comprises class attribute information for a corresponding business enterprise that uses the application server.

22. The system of claim 17 further comprising a version stamper, wherein the version stamper is configured to:
- determine attributes of each class in the second plurality of classes, wherein the attributes of a class are determined from a corresponding Javadoc; and
- store the attributes determined from the Javadoc of each class into a manifcst.mf file and the second attribute-list.

23. A method of providing remote support for a plurality of instances of a software application, wherein each instance is modified to include corresponding classes for meeting the requirements of one of a plurality of operating environments, the method being performed in a support server communicatively coupled to the application server by a network, the method comprising:
- maintaining, in said support server, a plurality of sets of attribute lists, each set of attribute list corresponding to one of the plurality of operating environments and indicates the expected attributes of the classes used by the instance corresponding to the one operating environment;
- receiving, in said support server, a first attribute-list from the application server, the first attribute list corresponding to a first operating environment for which an instance of the software application is deployed in the application server, wherein the first attribute-list comprises attributes corresponding to a first plurality of classes currently used by the instance of the software application, the first plurality of classes being used by the instance of the software application while being deployed in said application server;
- said support server receives said first attribute list from said application server on said network;
- identifying, in said support server, a second attribute list of the plurality of sets of attribute lists corresponding to the first operating environment;
- comparing, in said support server, the attributes of the second attribute-list with those of the first attribute-list, wherein the second attribute-list comprises attributes corresponding to a second plurality of classes associated with the first operating environment; and
- sending for displaying, by said support server, a diagnostic report for the instance of the software application based on the comparison between the second attribute-list and the first attribute-list, said diagnostic report indicating the results of comparing the attributes of the first attribute list with those in the second attribute list.

* * * * *